Oct. 12, 1926.  
G. C. COOK  
1,603,026  
REGENERATIVE AIR PREHEATER  
Filed Oct. 24, 1925  
2 Sheets-Sheet 1
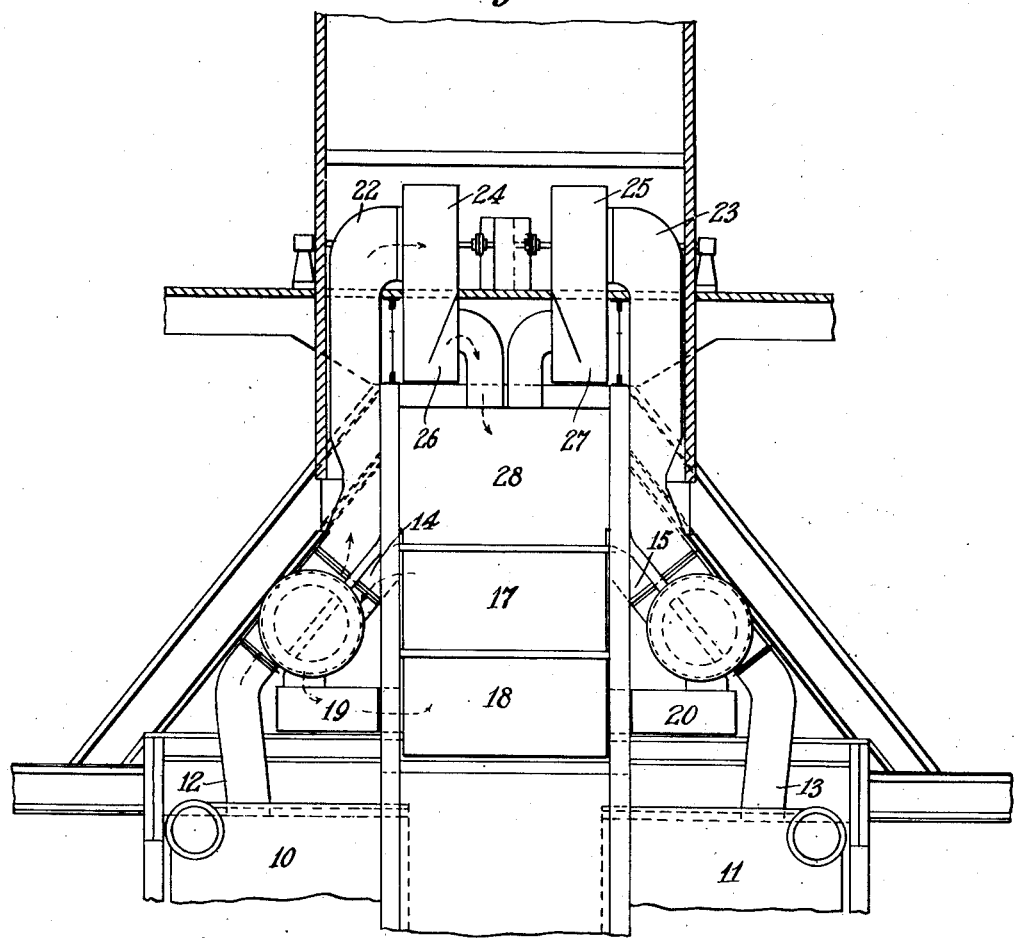
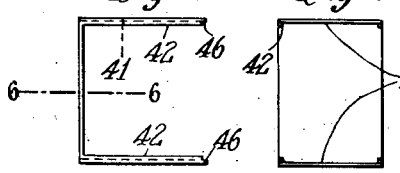
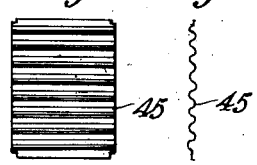
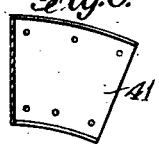
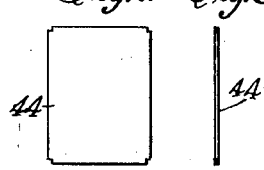
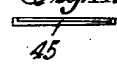
INVENTOR  
*George C. Cook*  
BY  
ATTORNEY Oct. 12, 1926.
G. C. COOK
1,603,026
REGENERATIVE AIR PREHEATER
Filed Oct. 24, 1925
2 Sheets-Sheet 2
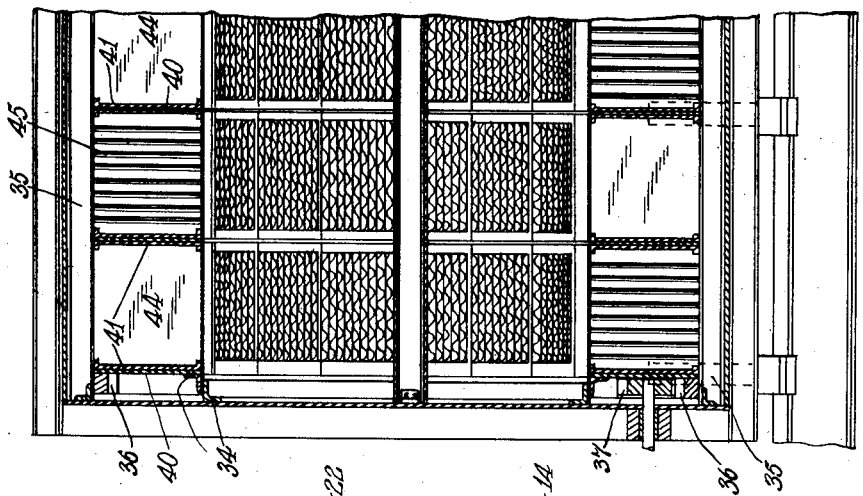
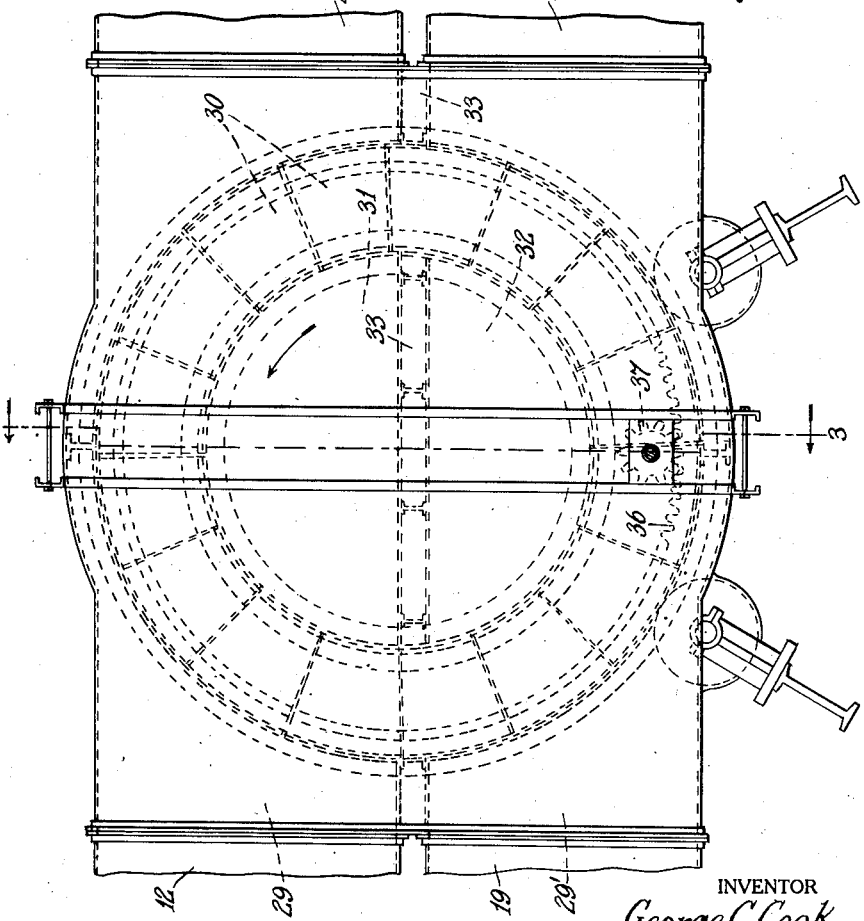
INVENTOR
George C. Cook
BY
ATTORNEY Patented Oct. 12, 1926.

1,603,026

UNITED STATES PATENT OFFICE.

GEORGE C. COOK, OF MILLINGTON, NEW JERSEY.

REGENERATIVE AIR PREHEATER.

Application filed October 24, 1925. Serial No. 64,599.

The invention relates to a regenerative air preheater such as may be employed in connection with the combustion of coal to secure greater efficiency therein. The invention relates more particularly to that type of preheater in which the regenerative mass comprises a continuously rotating rotor member thru which the air to be preheated and the spent flue gases for heating the same are arranged to pass, preferably, in opposite directions.

It has for its object to provide a compact preheater of the aforesaid type which may readily be adapted to the usual duct construction common to furnaces and when installed therein will occupy a minimum space. A further object of the invention resides in the particular construction of the preheater admitting of axial extension of the same to afford increased capacity and without entailing increased resistance to the flow of the gases.

The invention has for a still further object a preheater wherein the interchange of heat is conducted with especial efficiency. Further objects of the invention comprise certain details of construction, more especially in connection with the assembly and mounting of the heat interchanging members composing the regenerator and whereby possible leakage between the two gases is reduced to a minimum and a maximum of regenerative surface is available.

To this end, the invention comprises a hollow rotatable drum or regenerative mass operating thru both an air duct and a duct for the spent flue gases (said rotatable mass being extended transversely of said ducts which may be located parallel to each other) with the ends of the mass closed off by the walls of the ducts, while the cylindrical free space within the said mass is itself divided into two compartments, as by a suitable centrally located partition member. The arrangement is such that the axis of rotation of the rotatable mass is substantially at right angles to the plane of the directions of flow of the gases thru the said ducts.

The nature of the invention, however, will best be understood when described in connection with the accompanying drawings, in which—

Fig. 1 illustrates in elevation and part section a pair of the novel preheaters installed at the top of the boiler furnace structures.

Fig. 2 is a front elevation of the novel preheater.

Fig. 3 is a transverse section taken on the line 3—3, Fig. 2, looking in the direction of the arrows.

Figs. 4 and 5 are respectively a plan and front elevation of a basket or retaining member for holding the heat interchanging plates; and Fig. 6 is a section taken on the line 6—6, Fig. 5.

Figs. 7 and 8 are respectively a front elevation and side elevation of the heat interchanging plates.

Figs. 9, 10 and 11 are respectively a front and side elevation and a plan of a different form of the heat interchanging plates and which are utilized as spacer members between the plates illustrated in Figs. 7 and 8.

Referring to Fig. 1 of the drawings, which illustrates a boiler furnace structure, and in which 10 and 11 designate the tops of a pair of a battery of furnaces, it will be noted that the spent flue gases are discharged therefrom thru ducts 12 and 13 respectively which lead to the respective preheating devices, hereinafter more fully described. The incoming air, which is of a more or less low temperature, is conducted to the respective preheaters by corresponding ducts 14 and 15 communicating with a common air duct 17, which is shown as located above the hot air duct 18 common to the two furnaces for supplying thereto the requisite air for combustion at the highest possible temperature. The air passing from the inlet ducts 14 and 15 thru each preheater device is discharged therefrom thru respective ducts 19 and 20 into the said common air duct 18, while the waste flue gases, after passing thru the preheater, continue up the flues 22 and 23, thru fans 24 and 25 and cinder collectors 26 and 27 to the breeching or discharge duct 28 connected with a chimney (not shown), as is well understood in the art.

The casing of the preheater apparatus is divided substantially midway of its length in manner such that corresponding ducts 29 and 29' are provided therein and lie one above the other in substantially parallel relationship to correspond with respective gas and air ducts. Within the two ducts 29 and 29' is rotatably mounted the regenerative mass which comprises substantially a succession of annular heat interchanging members 30 hereinafter more fully described, and an upper and a lower chamber 31 and 32 respectively, the two chambers being provided therein by a centrally disposed and stationary wall member 33 corresponding to the division of the casing into the ducts 29 and 29'. The said mass forms in effect a hollow cylinder or drum member which is closed at the opposite ends by the walls of the casing to seal same at said ends, as by cooperating angle pieces 34, the one being secured to the casing wall and the other to the mass to rotate therewith. As the drum as a whole rotates within the respective ducts 29 and 29', it is peripherally sealed in same at the respective upper and lower walls of the casing by suitable sealing members as the I-beams 35 which are disposed parallel to its axis of rotation. The drum, moreover is mounted for slow rotation, as by being supported within one of the ducts upon suitable rollers properly sealed by the casing walls; and is driven thru an internal gear 36 attached to the preheater member and engaged by a corresponding pinion 37 rotatably mounted in the casing wall and driven by a suitable prime mover (not shown).

The annulus 30 may conveniently be constructed of a plurality of annular disk members 40 secured together by arcuate U-shaped basket or retaining members 41 circularly disposed between pairs of the disk members thru the arms of said basket members which are riveted to adjacent disks, as indicated more clearly in Fig. 3; and the said arms are provided with ledges 42 notched at their outer ends. Successive retaining members thus form a continuous series over the corresponding disks 40, affording series of peripheral pockets designed to retain heat interchanging members, while successive disk members are axially disposed to provide a hollow cylindrical member or drum rotatable in the casing as hereinbefore set forth.

The said heat interchanging members are in the form of thin sheet metal plates 44, Figs. 7 and 8, which are notched at the corners, as indicated, to fit over the ledges 42 along the top and bottom of the arms of the basket members. In order to provide for spacing of these plates for securing a passageway therebetween for the gases, corrugated plates 45 are alternated with the plates 44. The plates 45, moreover, are slightly tapered toward the center of an annular member 40 to accommodate the angularity. In assembling the plates in the baskets on a pair of disks, it will be understood that the entrance notches 46 are to be suitably blocked when the plates are all in place in a basket.

A drum of considerable dimension axially may thus be built up by adding successive rings and retaining members and fixing in the respective retaining members with the plates 44 and 45 as hereinbefore set forth. When thus assembled, the rotating drum presents passageways directed substantially radially towards the chambers 31 and 32; and as the drum member slowly rotates, the gases pass thru the passageways provided between the said plates thereof into the interior of a chamber 31 or 32 and then out from the opposite side of the particular chamber again into the corresponding duct. That is to say, reference being had more particularly to Fig. 2, (the direction of rotation being indicated by an arrow) the waste flue gas entering thru the duct 12 to the duct 29 will contact with the plates of the rotating drum member at a point where the same have already been heated to a substantial degree, the said plates which have thus been subjected to the highest temperature of the waste gases passing then to the portion of the incoming air duct 29' (communicating with duct 14) where the air therein is substantially at its hottest temperature. In the further rotation of the annular member, the various plates pass out of the air duct 29' and are then at their lowest temperature, whereupon they come in contact with the waste flue gases at their lowest temperature as the same are leaving the drum member. The plates in the further rotation of said drum member then again gradually attain a higher degree of temperature, whereupon the cycle is repeated.

By the foregoing expedient, it will be noted also that there is a substantially continuous sealing at the periphery of the regenerative mass as it passes from one duct to the other, thus obviating delivery of appreciable quantities of spent gas to the incoming air for combustion and vice versa. Moreover, the full capacity of each plate is available for the accumulation and delivery of heat; and more uniform temperature of gas and air leaving the preheater is attained over the cross-sectional area of the exits of the respective ducts, reducing efficiency-destroying stratification such as prevails, as a rule, in constructions involving heating elements which in their travel pass thru the gaseous media but once prior to their entrance from the one medium into the other.

I claim:—

1. A regenerative preheater for air and the like in furnace plants, comprising a casing affording a pair of adjacent ducts respectively for flue gases and air, a mass of porous regenerative material in the form of a hollow cylinder rotatably mounted within said ducts, the space within the hollow cylinder being divided by a partition between the fluid ducts into two substantially semi-cylindrical chambers adapted to communicate with the respective ducts, the fluid of one duct entering the one chamber thru one side of said mass and then leaving said chamber thru the mass at the opposite side and similarly the fluid of the other duct entering the corresponding chamber but in a reverse direction through one side of the said mass of regenerative material and leaving said chamber therethru at the opposite side.

2. A regenerative preheater for air and the like in furnace plants, comprising a casing affording a pair of parallel ducts respectively for flue gases and air, a mass of porous regenerative material in the form of a hollow cylinder rotatably mounted within said ducts to rotate about an axis at right angles to the directions of the flow of the respective fluids in the ducts and sealed at portions of its periphery and at its ends by the walls of said ducts, the space within the hollow cylinder being divided by a partition parallel to and between the fluid ducts into two substantially semi-cylindrical chambers adapted to communicate with the respective ducts, the fluid of one duct entering the one chamber thru one side of said mass and then leaving said chamber thru the mass at the opposite side and similarly the fluid of the other duct entering the corresponding chamber but in a reverse direction thru one side of the said mass of regenerative material and leaving said chamber therethru at the opposite side.

3. A regenerative preheater for air and the like in furnace plants, comprising a casing affording a pair of parallel ducts respectively for flue gases and air, a regenerator member consisting of a plurality of axially disposed annular disks and intermediate radially disposed metal plates held therebetween, the said regenerator being rotatively mounted within said ducts to rotate about an axis at right angles to the directions of the flow of the respective fluids in the ducts and sealed at portions of the periphery and at its ends by the walls of said ducts, the space within the hollow cylinder being divided by a partition parallel to and between the fluid ducts into two semi-cylindrical chambers adapted to communicate with the respective ducts, the fluid of one duct entering the one chamber between the plates and also leaving said chamber thru the plates at the opposite side and similarly the fluid of the other duct entering the corresponding chamber but in a reverse direction thru the said plates and leaving said chamber therethru at the opposite side.

4. A regenerative preheater for air and the like in furnace plants, comprising a casing, an annular mass rotatable therein and composed of alternate flat and corrugated plates with surfaces in planes perpendicular to the plane of rotation to provide substantially radial fluid passages from the periphery to the space within said annular mass, a partition separating the said space, and two pairs of ducts communicating through the annular mass with the respective separated portions.

5. In a regenerative preheater for air and the like in furnace plants: a regenerative mass for the fluids, comprising a rotatable annulus of alternate flat and corrugated plates, the plates being disposed with surfaces in planes perpendicular to the plane of rotation and providing substantially radial fluid passages from the periphery to the space within said annulus.

6. In a regenerative preheater for air and the like in furnace plants: a regenerative mass for the fluids, comprising a rotatable annulus of radially disposed alternate flat and corrugated plates, lying in planes including the axis of rotation and providing radial fluid passages from the periphery to the space within said annulus.

7. In a regenerative preheater for air and the like in furnace plants: a regenerative mass for the fluids, comprising a succession of annular disks, retainer members secured therebetween, and metal plates held therein to provide passageways therethru for the gases, the annular disks, retainer members and metal plates all being of substantially the same radial dimensions.

8. In a regenerative preheater for air and the like in furnace plants: a regenerative mass for the fluids, comprising a succession of annular disks, spacing basket members having arms attached to the disks, and separated metal plates held within the respective basket members, and of the same radial dimensions as said basket members.

9. In a regenerative preheater for air and the like in furnace plants: a regenerative mass for the fluids, comprising a succession of annular disks, basket members having arms attached to the disks, and provided with ledges, and separated metal plates notched at the corners to be held in the respective basket members by the said ledges.

In testimony whereof I affix my signature.

GEORGE C. COOK.